(12) United States Patent
Pu et al.

(10) Patent No.: US 10,659,824 B2
(45) Date of Patent: May 19, 2020

(54) VIDEO PLAYBACK METHOD AND APPARATUS

(71) Applicant: Hangzhou Hikvision Digital Technology Co., Ltd., Hangzhou, Zhejiang (CN)

(72) Inventors: Shiliang Pu, Zhejiang (CN); Shengsen Zhang, Zhejiang (CN); Guangkai Ding, Zhejiang (CN); Wei Wang, Zhejiang (CN); Qiqian Lin, Zhejiang (CN); Weichun Wang, Zhejiang (CN)

(73) Assignee: Hangzhou Hikvision Digital Technology Co., Ltd. (CN)

( * ) Notice: Subject to any disclaimer, the term of this patent is extended or adjusted under 35 U.S.C. 154(b) by 0 days.

(21) Appl. No.: 16/309,075

(22) PCT Filed: Feb. 15, 2017

(86) PCT No.: PCT/CN2017/073568
§ 371 (c)(1),
(2) Date: Dec. 11, 2018

(87) PCT Pub. No.: WO2017/215279
PCT Pub. Date: Dec. 21, 2017

(65) Prior Publication Data
US 2019/0313136 A1 Oct. 10, 2019

(30) Foreign Application Priority Data
Jun. 12, 2016 (CN) .......................... 2016 1 0409041

(51) Int. Cl.
*H04N 21/2343* (2011.01)
*H04N 21/24* (2011.01)
(Continued)

(52) U.S. Cl.
CPC . *H04N 21/234381* (2013.01); *H04N 21/2387* (2013.01); *H04N 21/2393* (2013.01);
(Continued)

(58) Field of Classification Search
None
See application file for complete search history.

(56) References Cited

U.S. PATENT DOCUMENTS 8,407,747 B1 * 3/2013 Inskip .............. H04N 21/23438
725/90
2007/0058926 A1 3/2007 Virdi et al.
(Continued)

FOREIGN PATENT DOCUMENTS

CN 104639951 A 5/2015
CN 104869430 A 8/2015
(Continued)

OTHER PUBLICATIONS

International Search Report dated Apr. 28, 2017, issued in connection with International Application No. PCT/CN2017/073568 filed on Feb. 15, 2017, 4 pages.
(Continued)

*Primary Examiner* — Frederick D Bailey
(74) *Attorney, Agent, or Firm* — McDonnell Boehnen Hulbert & Berghoff LLP

(57) ABSTRACT

Embodiments of the present application disclose a video playback method and apparatus, which relate to the field of video communication technologies. The method includes: receiving a data obtaining request for a video to be played back sent by a client; estimating a current data transmission speed according to historical data transmission speeds; selecting a target video frame discarding scheme from preset video frame discarding schemes, according to the current data transmission speed and a theoretical data transmission
(Continued)

speed corresponding to a preset video frame discarding scheme, wherein the theoretical data transmission speed is determined according to the multiplied speed for video playback; and performing discard processing on video data of the video to be played back according to the target video frame discarding scheme, and sending to the client the video data that has been subjected to the discard processing, so that the client plays back the video to be played back. The solutions provided by the embodiments of the present application reduces the required network bandwidth for a video playback.

10 Claims, 4 Drawing Sheets

(51) Int. Cl.
 *H04N 21/2662* (2011.01)
 *H04N 21/239* (2011.01)
 *H04N 21/2387* (2011.01)
(52) U.S. Cl.
 CPC ... *H04N 21/23439* (2013.01); *H04N 21/2402* (2013.01); *H04N 21/2662* (2013.01)

(56) References Cited

U.S. PATENT DOCUMENTS

| 2009/0254657 | A1  | 10/2009 | Melnyk et al. |
| 2014/0108622 | A1* | 4/2014  | Guo ............... H04N 21/2662 709/219 |
| 2015/0089079 | A1  | 3/2015  | Knittle |
| 2015/0350714 | A1* | 12/2015 | Normile ............ H04N 21/433 725/32 |

FOREIGN PATENT DOCUMENTS

| WO | 2013/138224 A2 | 9/2013 |
| WO | 2015/104570 A1 | 7/2015 |

OTHER PUBLICATIONS

Written Opinion dated Apr. 28, 2017, issued in connection with International Application No. PCT/CN2017/073568 filed on Feb. 15, 2017, 3 pages.

* cited by examiner

VIDEO PLAYBACK METHOD AND APPARATUS

The present application is a US national phase under 35 U.S.C. § 371 of international application PCT/CN2017/073568, filed Feb. 15, 2017, which claims priority to Chinese patent application No. 201610409041.5, filed with the China National Intellectual Property Administration on Jun. 12, 2016 and entitled "VIDEO PLAYBACK METHOD AND APPARATUS", which is incorporated herein by reference in their entirety.

TECHNICAL FIELD

The present application relates to the field of video communication technology, and in particular, to a video playback method and apparatus.

BACKGROUND

With advances in computer and network technology, cloud video storage systems have been widely used, especially in the field of video surveillance. A cloud video storage system generally includes a client, a management server, a storage server, and a data forwarding server.

A playback of a video at a multiplied speed is often required in the cloud video storage system. In the related art, the video playback performed in the cloud video storage system generally includes the following operations:

a client requests a storage management server for the address of a data forwarding server;

the storage management server determines a data forwarding server, and sends the address of the data forwarding server to the client;

the client sends a video playback request to the data forwarding server;

upon receiving the video playback request, the data forwarding server obtains video data of the video to be played back from a storage server and buffers the obtained video data;

the client obtains the buffered video data from the data forwarding server and plays back the obtained data at a multiplied speed.

For a bit stream having a bit rate of 4 M, if the playback is performed at 8 times its normal speed in the way described above, a bandwidth of 4*8=32 (Mbps) is required. In addition, a video is often played back in multiple views. Therefore, the bandwidth has to be multiplied by the number of views of the playback. For example, if the number of views of the playback is 4, the required bandwidth is 4*8*4=128 (Mbps).

In practice, however, not all networks can provide a bandwidth of 128 Mbps, especially for a case where the client requiring the playback and the data forwarding server are not in a same network segment. In such a case, it is more difficult for a client in a handheld device under 3G/4G network to achieve a bandwidth of 128 Mbps. It can be seen that a video playback performed in the manner described above requires a high network bandwidth.

SUMMARY

Embodiments of the present application disclose a video playback method and apparatus to reduce required network bandwidth during video playback.

To achieve the above object, an embodiment of the present application discloses a video playback method, which includes:

receiving a data obtaining request for a video to be played back sent by a client, wherein the data obtaining request includes a multiplied speed for video playback;

estimating a current data transmission speed according to historical data transmission speeds, wherein the historical data transmission speeds are obtained according to a preset statistical rule;

selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and performing discard processing on video data of the video to be played back according to the target video frame discarding scheme, and sending to the client the video data that has been subjected to the discard processing, so that the client plays back the video to be played back.

In an implementation of the present application, the step of selecting a target video frame discarding scheme from preset video frame discarding schemes, according to the current data transmission speed and a theoretical data transmission speed corresponding to a preset video frame discarding scheme, includes:

determining a video frame discarding scheme with the highest priority in the preset video frame discarding schemes as a video frame discarding scheme to be selected;

calculating a target theoretical data transmission speed corresponding to the video frame discarding scheme to be selected, based on a bandwidth compression ratio, a rate for the video playback, and a bit rate for the video to be played back under the video frame discarding scheme to be selected;

determining whether the target theoretical data transmission speed is greater than or equal to the product of the current data transmission speed and a first preset coefficient; and if so, determining the video frame discarding scheme to be selected as the target video frame discarding scheme;

if not, updating the video frame discarding scheme to be selected to a video frame discarding scheme with the next lower priority according to a descending order by priority, and returning to the step of calculating a target theoretical data transmission speed corresponding to the video frame discarding scheme to be selected, based on a bandwidth compression ratio, a rate for the video playback, and a bit rate for the video to be played back under the video frame discarding scheme to be selected, until the video frame discarding scheme to be selected is a video frame discarding scheme with the lowest priority, and then determining the video frame discarding scheme to be selected as the target video frame discarding scheme.

In an implementation of the present application, the step of estimating a current data transmission speed according to historical data transmission speeds, include:

estimating the current data transmission speed $Speed_{actual}$ according to the following formula:

$$Speed_{actual} = T_1 * Speed_1 + \ldots + T_n * Speed_n$$

Where $Speed_n \ldots Speed_1$ are n historical data transmission speeds obtained according to the preset statistical rule, and are in ascending order by duration from the moment corresponding to each historical data transmission speed to the current moment, and $T_n \ldots T_1$ are preset coefficients respectively corresponding to $Speed_n \ldots Speed_1$, and the sum of $T_n \ldots T_1$ is equal to 1.

In an implementation of the present application, $T_n < (T_{n-1} + \ldots + T_1)$.

In an implementation of the present application, before the step of receiving a data obtaining request for a video to be played back sent by a client, the method further includes:

receiving a video playback request sent by the client;

sending a query request for a video segment of the video to be played back to a storage management server according to the video playback request;

receiving a query result returned by the storage management server, where the query result includes a storage server corresponding to the video segment; and obtaining the video data of the video to be played back from the storage server based on the video segment according to the query result, and buffering the obtained video data.

To achieve the above object, an embodiment of the present application discloses a video playback apparatus, which includes:

a request receiving module, configured for receiving a data obtaining request for a video to be played back sent by a client, wherein the data obtaining request includes a multiplied speed for video playback;

a speed estimating module, configured for estimating a current data transmission speed according to historical data transmission speeds, wherein the historical data transmission speeds are obtained according to a preset statistical rule;

a scheme selecting module, configured for selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and a discard processing module, configured for performing discard processing on video data of the video to be played back according to the target video frame discarding scheme, and sending to the client the video data that has been subjected to the discard processing, so that the client plays back the video to be played back.

In an implementation of the present application, the scheme selecting module includes:

a first scheme determining sub-module, configured for determining a video frame discarding scheme with the highest priority in the preset video frame discarding schemes as a video frame discarding scheme to be selected;

a speed calculating sub-module, configured for calculating a target theoretical data transmission speed corresponding to the video frame discarding scheme to be selected, based on a bandwidth compression ratio, a rate for the video playback, and a bit rate for the video to be played back under the video frame discarding scheme to be selected;

a speed determining sub-module, configured for determining whether the target theoretical data transmission speed is greater than or equal to the product of the current data transmission speed and a first preset coefficient;

a second scheme determining sub-module, configured for determining the video frame discarding scheme to be selected as the target video frame discarding scheme, when the speed determining sub-module determines that the target theoretical data transmission speed is greater than or equal to the product of the current data transmission speed and the first preset coefficient;

a scheme updating sub-module, configured for, when the speed determining sub-module determines that the target theoretical data transmission speed is not greater than or equal to the product of the current data transmission speed and the first preset coefficient, updating the video frame discarding scheme to be selected to a video frame discarding scheme with the next lower priority according to a descending order by priority, and triggering the scheme selecting module, until the video frame discarding scheme to be selected is a video frame discarding scheme with the lowest priority, and then determining the video frame discarding scheme to be selected as the target video frame discarding scheme.

In an implementation of the application, the speed estimating module is specifically configured for estimating the current data transmission speed $Speed_{actual}$ according to the following formula:

$$Speed_{actual} = T_1 * Speed_1 + \ldots + T_n * Speed_n$$

Where $Speed_n \ldots Speed_1$ are n historical data transmission speeds obtained according to the preset statistical rule, and are in ascending order by duration from the moment corresponding to each historical data transmission speed to the current moment, and $T_n \ldots T_1$ are preset coefficients respectively corresponding to $Speed_n \ldots Speed_1$, and the sum of $T_n \ldots T_1$ is equal to 1.

In an implementation of the present application, $T_n < (T_{n-1} + \ldots + T_1)$.

In an implementation of the present application, the video playback apparatus further includes:

a playback request receiving module, configured for receiving a video playback request sent by the client, before the request receiving module receives the data obtaining request;

a query request sending module, configured for sending a query request for a video segment of the video to be played back to a storage management server according to the video playback request;

a query result receiving module, configured for receiving a query result returned by the storage management server, where the query result includes a storage server corresponding to the video segment; and a data buffering module, configured for obtaining the video data of the video to be played back from the storage server based on the video segment according to the query result, and buffering the obtained video data.

To achieve the above object, an embodiment of the present application discloses a server, which includes:

a processor, a memory, a communication interface, and a bus.

The processor, the memory and the communication interface are connected and communicate with each other via the bus.

The memory stores executable program codes.

The processor reads the executable program codes stored in the memory to execute a program corresponding to the executable program codes, to carry out the video playback method of the various embodiments of the application.

To achieve the above object, an embodiment of the present application discloses an application that, when being executed, carries out the video playback method of the various implementations described above.

To achieve the above object, an embodiment of the present application discloses a storage medium for storing executable program codes that is used to carry out the video playback method of the various implementations described above.

It can be seen from the above, in the solutions provided by the embodiments of the present application, after receiving a data obtaining request for a video to be played back sent by a client, a current data transmission speed is estimated according to historical data transmission speeds. A target video frame discarding scheme is selected from preset video frame discarding schemes, according to the current data transmission speed and a theoretical data transmission speed corresponding to a preset video frame discarding scheme. Discard processing is performed on the video data of the video to be played back according to the target video frame discarding scheme, and the video data that has been subjected to the discard processing is sent to the client, so that the client plays back the video to be played back. In the above solutions provided by the embodiments of the present application, the video data sent to the client is the video data after the video frame discarding processing, and thus requires less network bandwidth compared to sending all the video data of the video to be played back. Therefore, with the solutions provided by the embodiments of the present application, the required network bandwidth for a video playback may be reduced.

BRIEF DESCRIPTION OF THE DRAWINGS

In order to more clearly describe the technical solutions of the embodiments of the application and related art, drawings that are used in the illustration of the embodiments and the related art will be briefly described below. Obviously, the drawings below are for only some embodiments of the present application. One of ordinary skills in the art may also obtain other drawings based on drawings herein without any creative efforts.

DETAILED DESCRIPTION

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

Figure 1:
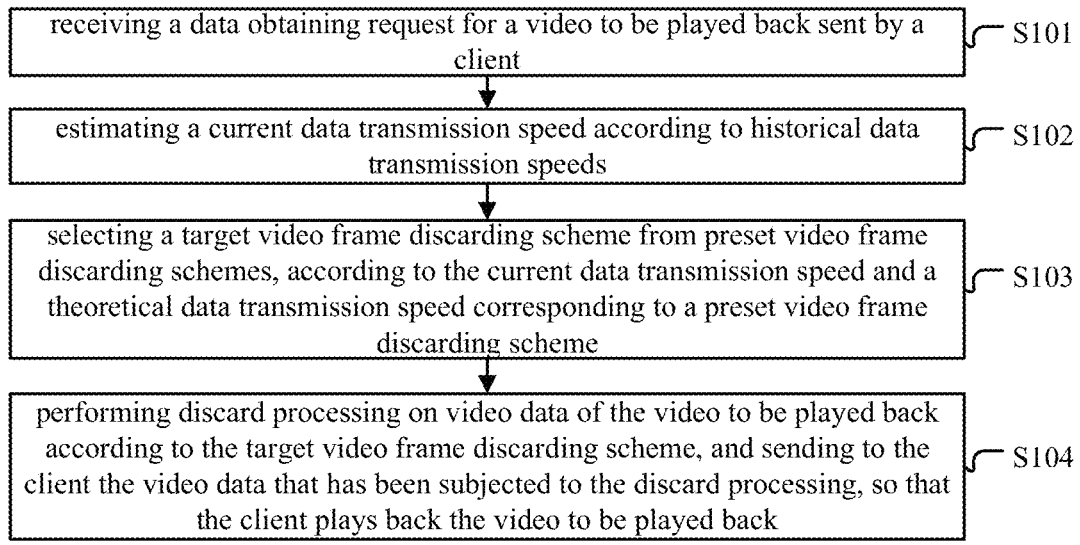
FIG. 1 is a schematic flow chart depicting a video playback method according to an embodiment of the present application.

FIG. 1 is a schematic flow chart depicting a video playback method according to an embodiment of the present application. The method includes:

S101, receiving a data obtaining request for a video to be played back sent by a client.

It should be noted that the subject applying the embodiment of the present application may be a data forwarding server in a cloud video storage system, and may be any server that can provide video data of a video to be played back, which are not limited here.

The data obtaining request includes at least a rate for the video playback, such as, a rate of 5, a rate of 8, or the like. This indicates a playback of the video at a speed that is 5 times of its normal play speed, a playback of the video at a speed that is 8 times of its normal play speed, and so on. Of course, the data obtaining request may further include other information, such as an identifier of the video to be played back, which is not limited in the present application.

The video to be played back may be a video corresponding to a certain identifier, may be a video encoded by a certain encoder, may be a video encoded within a certain time period, or may be a video encoded within a specific time period by a specific encoder.

In the cloud video storage system, the video data of the video to be played back may be stored in one storage server or may be distributed in a plurality of storage servers.

S102, estimating a current data transmission speed according to historical data transmission speeds.

The historical data transmission speeds are obtained according to a preset statistical rule.

Optionally, the preset statistical rule may be that the statistics may be performed based on GOP (Group of Pictures). A GOP consists of an I-frame and a series of non-I-frames, and the number of the non-I-frames is not limited. A GOP begins with an I-frame.

For example, a GOP consists of 1 I-frame and 14 P-frames, or a GOP consists of 1 I-frame, 14 P-frames and 10 B-frames.

In determining a GOP, it may determine that a GOP begins when an I-frame is detected. The subsequent frames are then detected one by one.

When another I-frame is detected, it may determine the GOP ends and another GOP begins.

When the statistics is performed based on GOP, upon the end of a GOP is detected, it may start to do statistics to obtain the historical data transmission speed corresponding to the GOP.

The preset statistical rule may also be that the statistic may be performed according to time. For example, the statistic is performed in units of 1 second, and the like.

In an optional implementation of the present application, in estimating the current data transmission speed according to the historical data transmission speeds, the current data transmission speed $Speed_{actual}$ may be estimated according to the following formula:

$$Speed_{actual} = T_1 * Speed_1 + \ldots + T_n * Speed_n$$

Where $Speed_n \ldots Speed_1$ are n historical data transmission speeds obtained according to the preset statistical rule, and are in ascending order by duration from the moment corresponding to each historical data transmission speed to the current moment, and $T_n \ldots T_1$ are preset coefficients respectively corresponding to $Speed_n \ldots Speed_1$, and the sum of $T_n \ldots T_1$ is equal to 1.

Those skilled in the art will appreciate that the data transmission corresponding to the historical data transmission speed at a time far away from the current time is relatively stable, and the data transmission corresponding to the historical data transmission speed at a time close to the current time may fluctuate. Given this, in an optional implementation of the present application, $T_n < (T_{n-1} + \ldots + T_1)$.

This may ensure the accuracy of the estimated current data transmission speed as much as possible.

Specifically, the value of the n may be 2, 3, 4, 5, or the like. As the value of n increases, the information available when estimating $Speed_{actual}$ is more richer, and the estimated $Speed_{actual}$ is more accurate. The present application does not limit the value of n. However, if the historical data transmission speed is a speed too far away from the current time, the correlation between it and the actual data transmission speed at the current time will be weakened. Therefore, the value of n cannot be increased without limitation. In practice, the value of n may be select according to specific situations.

For example, the value of n may be 2, and $Speed_{actual}=0.8*Speed_1+0.2*Speed_2$;

the value of n may be 3, and $Speed_{actual}=0.4*Speed_1+0.4*Speed_2+0.2*Speed_3$, or $Speed_{actual}=0.3*Speed_1+0.5*Speed_2+0.2*Speed_3$.

S103: selecting a target video frame discarding scheme from preset video frame discarding schemes, according to the current data transmission speed and a theoretical data transmission speed corresponding to a preset video frame discarding scheme.

Specifically, the preset video frame discarding scheme may include multiple schemes.

It should be appreciated that an I-frame is the basis for decoding other video frames. Therefore, the video frame discarding scheme is mainly for discarding non-I-frames, for example, discarding part or all P-frames, discarding part or all B-frames, or the like. Such a scheme may be considered as discarding an entire video frame.

Additionally, in discarding a video frame, in addition to discarding an entire video frame, part of the data of the video frame may be discarded.

For example, a video frame may be downsampled to reduce the resolution of the video. This scheme may not only apply to a non-I-frame, but also to an I-frame.

Specifically, in an implementation of the present application, it is assumed that a frame rate of the video to be played back is 25 frames/s; the I-frame interval is 25 frames (one I-frame per second), namely, a GOP contains an I-frame and 24 P-frames; the number of bits of the I-frame is 30% of the bit rate; and the goal is optimal image clarity and optimal playback smoothness. The preset video frame discarding schemes are as shown in Table 1 below.

TABLE 1

| Approach for discarding a video frame | Bandwidth compression ratio | Number of frames |
|---|---|---|
| Scheme A | Do not discard a video frame, play all frames back with normal frame rate | 100% | 100% |
| Scheme B | Discard ½ of the P-frames, keep all I-frames | 65% | 52% |
| Scheme C | Discard ¾ of the P-frames, keep all I-frames | 46.25% | 28% |
| Scheme D | Discard all P-frames, only keep all I-frames, i.e., a normal playback of only I-frames | 30% | 4% |
| Scheme E | Transcode a video of the I-frames for a playback with low resolution | <30% | 4% |

In scheme B and Scheme C, in discarding a P-frame, the P-frame may be selected at regular intervals for discarding, so that the playback is smooth without any stuck.

It can be seen from the Table above, discarding some non-key frames can save bandwidth on the one hand, and on the other hand, reduce the number of actual frames, reducing the pressure on hardware to decode and display. The more non-key frames are discarded, the more network bandwidth can be saved. However, discarding too many non-key frames will lead to poor smoothness of the playback. Therefore, for the playback of the video by using the solution provided by the embodiment of the present application, both network conditions and hardware conditions may be taken into consideration in selecting the video frame discarding scheme, such that an optimal playback at a multiplied speed can be achieved without affecting the visual effect and without upgrading the hardware device.

This may especially applicable for surveillance video, where the scene is often large while the target is small. If the playback at a multiplied speed with full frame rate cannot be achieved, the video frame discarding schemes listed in Table 1 can give priority to the clarity and smoothness of the image during the playback.

Further, the theoretical data transmission speed is determined according to the multiplied speed for video playback.

For one playback of the video at the multiplied speed, it is assumed that in the current video frame discarding scheme, the bandwidth compression rate is Compress, the rate to be multiplied by the normal speed for the playback is Rate, and the bit rate for the video to be played back is Bits. The theoretical data transmission speed $Speed_{ideal}$ under the current video frame discarding scheme can then be calculated according to the following formula:

$$Speed_{ideal}=Rate*Bits*Compress.$$

Specifically, the rate for the playback may be sent from the client. The bit rate may be obtained after the data forwarding server reads the video data of the video to be played back from the storage server. The bandwidth compression ratio may be obtained based on the ratio of the number of bits of the I-frames to the bit rate, which may be a preset value.

In an implementation of the present application, to select a target video frame discarding scheme from preset video frame discarding schemes, according to the current data transmission speed and a theoretical data transmission speed corresponding to the preset video frame discarding schemes, the following operations are performed:

determining a video frame discarding scheme with the highest priority in the preset video frame discarding schemes as a video frame discarding scheme to be selected;

calculating a theoretical data transmission speed corresponding to the video frame discarding scheme to be selected, based on the bandwidth compression ratio, the rate for the video playback, and the bit rate for the video to be played back under the video frame discarding scheme to be selected, where the resulting theoretical data transmission speed may be referred to as a target theoretical data transmission speed;

determining whether the target theoretical data transmission speed is greater than or equal to the product of the current data transmission speed and a first preset coefficient;

if so, determining the video frame discarding scheme to be selected as the target video frame discarding scheme;

if not, updating the video frame discarding scheme to be selected to a video frame discarding scheme with the next lower priority according to the descending order by priority, and returning to the step of calculating a target theoretical data transmission speed corresponding to another video frame discarding scheme to be selected, based on the bandwidth compression ratio, the rate for the video playback, and the bit rate for the video to be played back under the video frame discarding scheme to be selected, until the video frame discarding scheme to be selected is a video frame discarding scheme with the lowest priority; and determining the video frame discarding scheme to be selected as the target video frame discarding scheme.

Specifically, the first preset coefficient above may be 0.9, 0.8, etc., which is not limited herein.

S104: performing discard processing on video data of the video to be played back according to the target video frame discarding scheme, and sending to the client the video data that has been subjected to the discard processing, so that the client plays back the video to be played back.

In an implementation of the present application, when the target video frame discarding scheme is the video frame discarding scheme with the lowest priority, an alarm message may also be generated for prompt.

Operation and maintenance personnel determine whether there is an error in the network, and then perform manual intervention, such that a user get a better video playback experience.

As noted above, the video playback method provided by the embodiment of the present application is applicable to a data forwarding server in a cloud video storage system. In addition to the data forwarding server, the cloud video storage system may also include a storage management server, a storage server, and the like. The video data is stored in the storage server. Since there may be a plurality of storage servers in the system, video data of one video may be stored in multiple storage servers. For example, the video data of one video is divided into a plurality of video segments, and the video data is stored in storage servers based on video segments. In addition, the storage management server may be used to store the correspondence between each video segment and a storage server in which it is lacted.

Based on this, in an implementation of the present application, before receiving from a client a data obtaining request for a video to be played back, the method may further include:

receiving a video playback request sent by the client;

sending a query request for a video segment of the video to be played back to a storage management server according to the video playback request;

receiving a query result returned by the storage management server, where the query result includes a storage server corresponding to the video segment;

obtaining the video data of the video to be played back from the storage server based on the video segment according to the query result, and buffering the obtained video data.

On this basis, the operation S104 of performing discard processing on video data of the video to be played back according to the target video frame discarding scheme may be understood as performing discard processing on the video data of the video to be played back that is buffered in the storage server, according to the target video frame discarding scheme.

It can be seen from the above, in the solutions provided by the embodiments, after receiving a data obtaining request for a video to be played back sent by a client, a current data transmission speed is estimated according to historical data transmission speeds. A target video frame discarding scheme is selected from preset video frame discarding schemes, according to the current data transmission speed and a theoretical data transmission speed corresponding to a preset video frame discarding scheme. Discard processing is performed on the video data of the video to be played back according to the target video frame discarding scheme, and the video data that has been subjected to the discard processing is sent to the client, so that the client can play back the video to be played back. In the above solutions provided by the embodiments, the video data sent to the client is the video data after the video frame discarding processing, and thus requires less network bandwidth compared to sending all the video data of the video to be played back. Therefore, with the solutions provided by the embodiments described above, the required network bandwidth for a video playback may be reduced.

The video playback method provided by the embodiments of the present application is further described in detail by way of a specific example.

Figure 2:
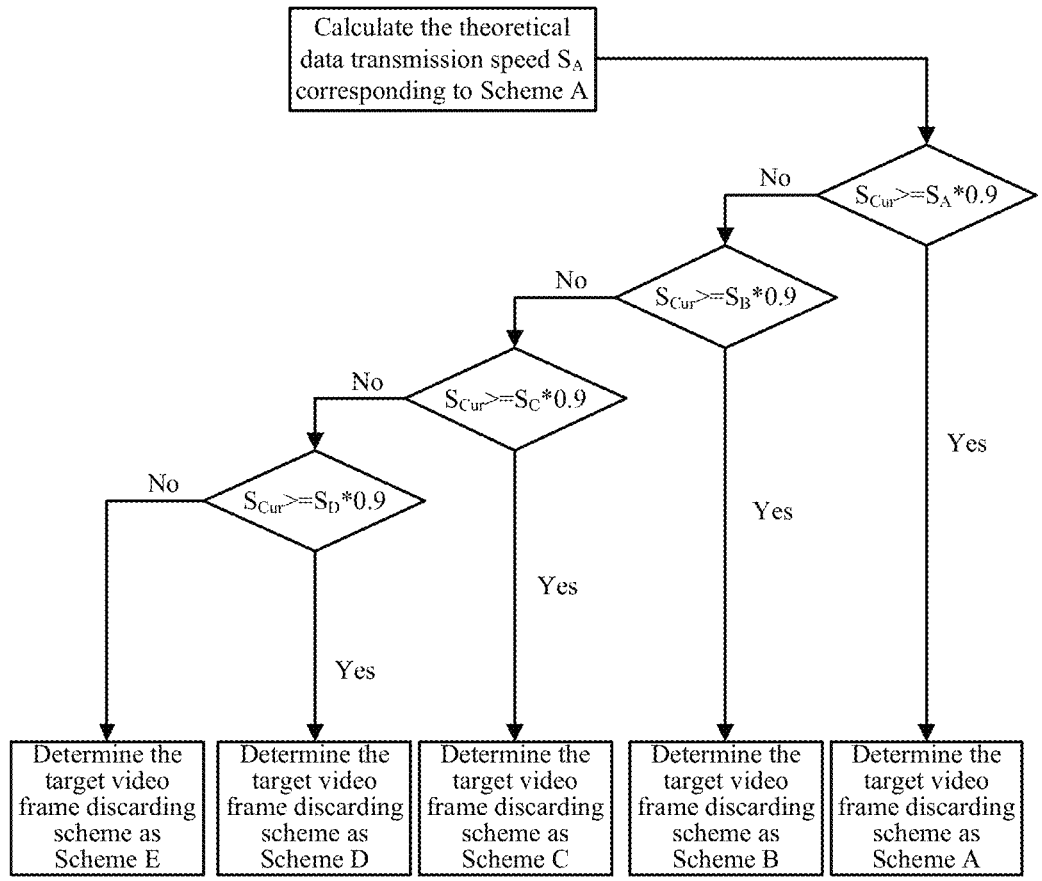
FIG. 2 is a schematic flow chart depicting steps for selecting a scheme for discarding a video frame according to an embodiment of the present application.

Example I: in connection with the information in Table 1, FIG. 2 illustrates a flowchart of the process for selecting a target video frame discarding scheme. It is assumed that the order of the five video frame discarding schemes in Table 1 in descending order by priority is Scheme A, Scheme B, Scheme C, Scheme D, Scheme E; and the first preset value is equal to 0.9.

After the current data transmission speed $S_{Cur}$ is estimated, the following operations are performed to determine the target video frame mode.

A video frame discarding scheme to be selected is first determined as Scheme A. A theoretical data transmission speed $S_A$ corresponding to Scheme A is calculated based on the bandwidth compression ratio, the rate for the video playback, and the bit rate for the video to be played back under Scheme A. A determination is made whether the current data transmission speed $S_{Cur}$ is greater than or equal to the product of the theoretical data transmission speed $S_A*0.9$. If so, the target video frame discarding scheme is determined as Scheme A; otherwise, the video frame discarding scheme to be selected is updated to Scheme B, and the following operations are performed.

A theoretical data transmission speed $S_B$ corresponding to Scheme B is calculated based on the bandwidth compression ratio, the rate for the video playback, and the bit rate for the video to be played back under Scheme B. A determination is made whether the current data transmission speed $S_{Cur}$ is greater than or equal to the product of the theoretical data transmission speed $S_B*0.9$. If so, the target video frame discarding scheme is determined as Scheme B; otherwise, the video frame discarding scheme to be selected is updated to Scheme C, and the following operations are performed.

A theoretical data transmission speed $S_C$ corresponding to Scheme C is calculated based on the bandwidth compression ratio, the rate for the video playback, and the bit rate for the video to be played back under Scheme C. A determination is made whether the current data transmission speed $S_{Cur}$ is greater than or equal to the product of the theoretical data transmission speed $S_C*0.9$. If so, the target video frame discarding scheme is determined as Scheme C; otherwise, the video frame discarding scheme to be selected is updated to Scheme D, and the following operations are performed.

A theoretical data transmission speed $S_D$ corresponding to Scheme D is calculated based on the bandwidth compression ratio, the rate for the video playback, and the bit rate for the video to be played back under Scheme D. A determination is made whether the current data transmission speed $S_{Cur}$ is greater than or equal to the product of the theoretical data transmission speed $S_D*0.9$. If so, the target video frame discarding scheme is determined as Scheme D; otherwise, the video frame discarding scheme to be selected is updated to Scheme E, and the target video frame discarding scheme is determined as Scheme E.

In addition, after the target video frame discarding scheme is determined as Scheme E, the Scheme E is used to perform discard processing on the video frames, and an alarm message may be generated to prompt the operation and maintenance personnel to perform manual intervention.

The video data is continuously transmitted to the client. After the video data that has been subjected to the discard processing is sent to the client in the above manner, if it is determined that there is more video data to be transmitted, the above process may be repeated until the all data is transmitted.

Example II: the above video playback method is illustrated on the basis of the cloud video storage system.

Figure 3:
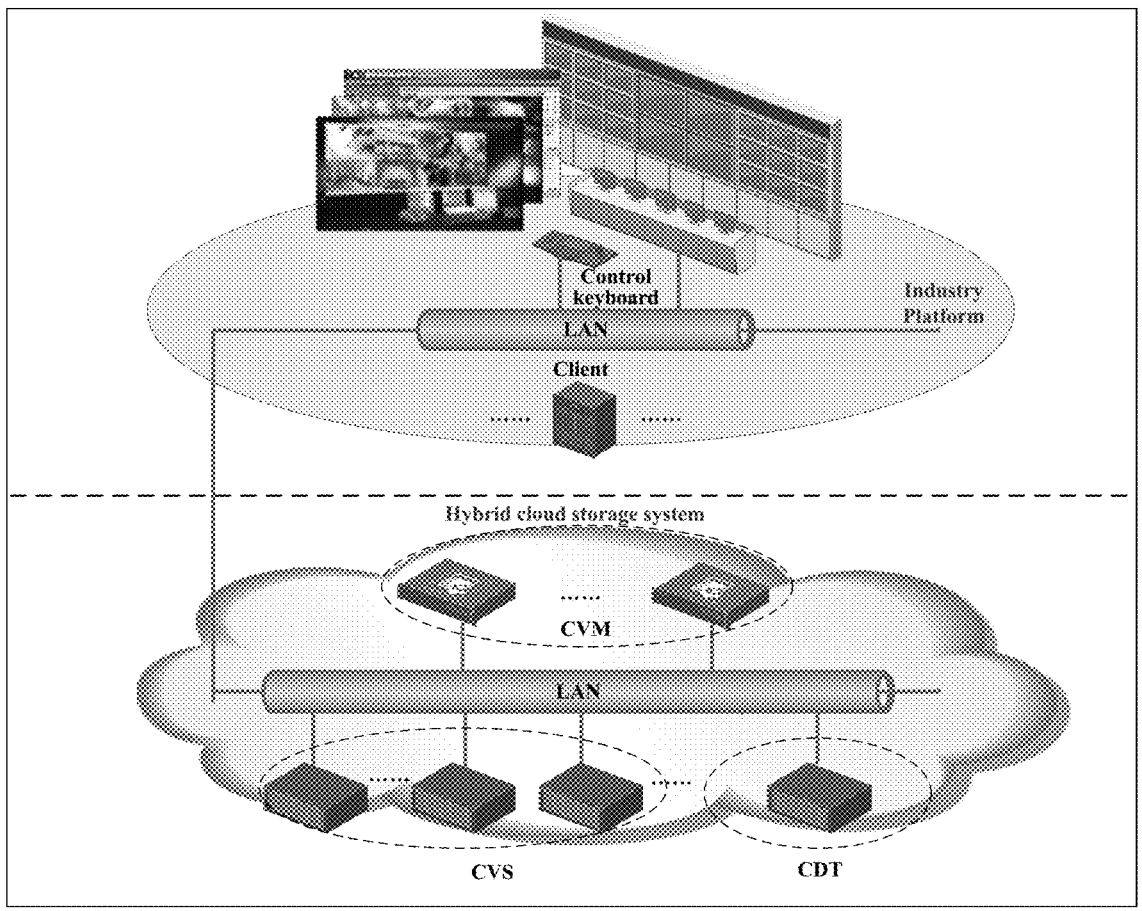
FIG. 3 is a diagram depicting the structure of a cloud video storage system according to an embodiment of the present application.

FIG. 3 is a diagram depicting the structure of a cloud video storage system according to an embodiment of the present application. The cloud video storage system includes a client (video integrated platform), a CVM (Cloud Video Master, storage management server), a CVS (Cloud Video Slave, storage server), and a CDT (Cloud Data Transmitter, data forwarding server).

Figure 4:
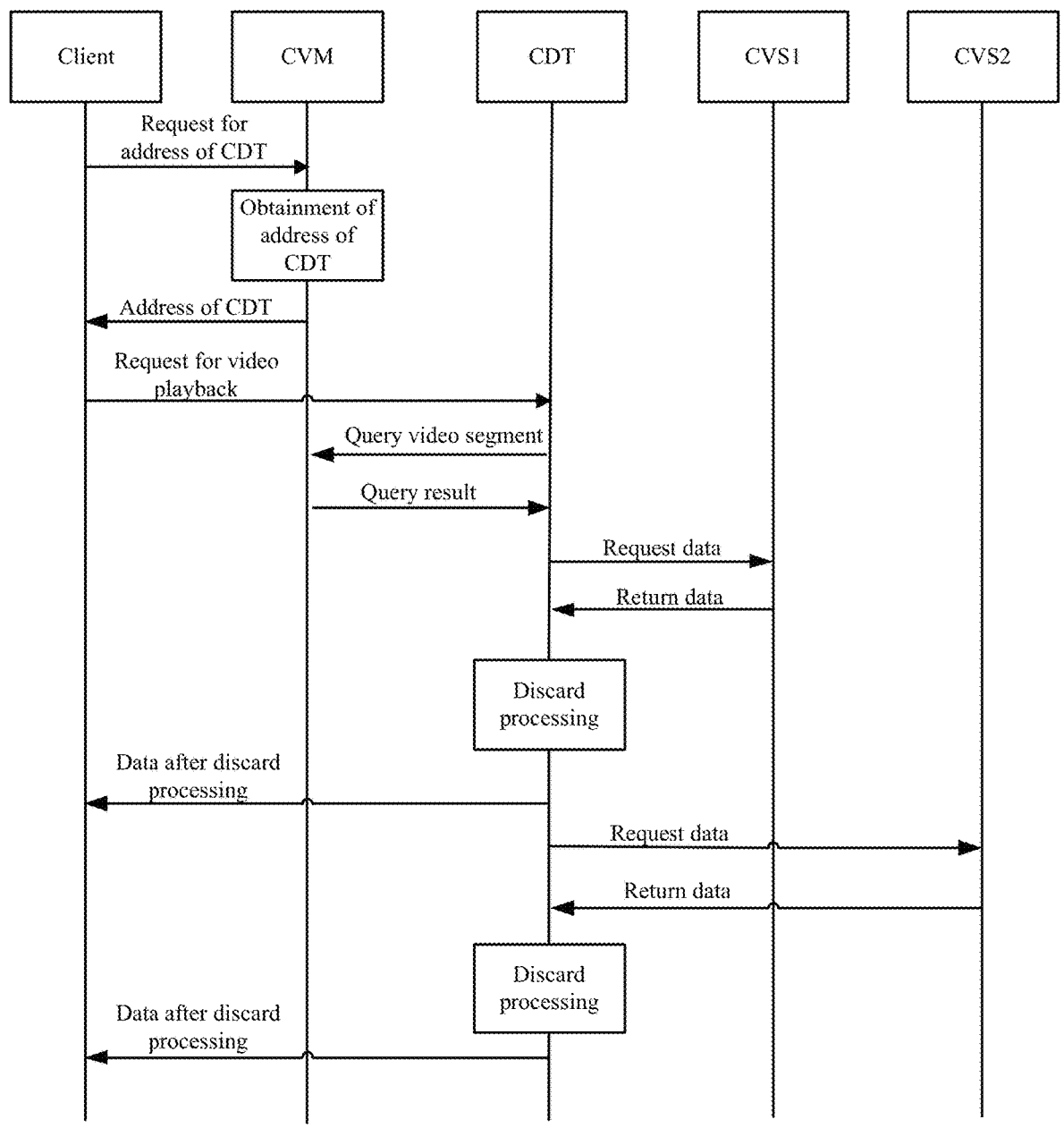
FIG. 4 is a diagram depicting the signaling flow of a video playback method according to an embodiment of the present application.

FIG. 4 is a diagram depicting the signaling flow of a video playback method on the basis of FIG. 3. Specifically, the video playback process includes the following steps.

Step 1: the client sends a CDT address obtaining request to the CVM;

after receiving the CDT address obtaining request, the CVM obtains the address of an available CDT, and returns the address of the available CDT to the client.

Step 2: the client sends a video playback request to the CDT according to the received CDT address.

Step 3: after receiving the video playback request, the CDT queries from the CVM information of all video segments encoded by a current encoder from a start time to an end time; the CVM searches all storage servers in the cloud domain according to an encoder trajectory table, and returns a query result to the CDT. The query result may contain a storage server where the video segments are located. These video segments may be located in a same storage server or in different storage servers.

Step 4: the CDT starts a new thread, and downloads video data from a CVS one by one according to the above query result and puts the data in its buffer, while waiting for the client to obtain the data from the buffer.

Step 5: the client obtains the data from the buffer of the CDT according to the requirement of the user for the multiplied speed at which the video is played back and the requirement of a speed for decoding and display.

Step 6: the CDT estimates the current data transmission speed according to the historical data transmission speeds. Specifically, the current data transmission speed $Speed_{actual}$ may be estimated according to the following expression based on two latest historical data transmission speeds with the shortest time from the current time:

$$Speed_{actual}=0.8*Speed_1+0.2*Speed_2$$

The CDT then selects the target video frame discarding scheme from the video frame discarding schemes listed in Table 1 following the flow shown in FIG. 2; and the CDT performs discard processing on the video data in the buffer using the above target video frame discarding scheme, and transmits to the client the video data that has been subjected to the discard processing, so that the client can play back the received video data.

It should be noted that the CDT obtains the requested data from a CVS, performs discard processing on the requested data and then transmits it to the client, and the CDT may continue to obtain the requested data from other CVSs, and repeats the process of performing discard processing on the requested data and transmitting it to the client.

Corresponding to the above video playback method, an embodiment of the present application further provides a video playback apparatus.

Figure 5:
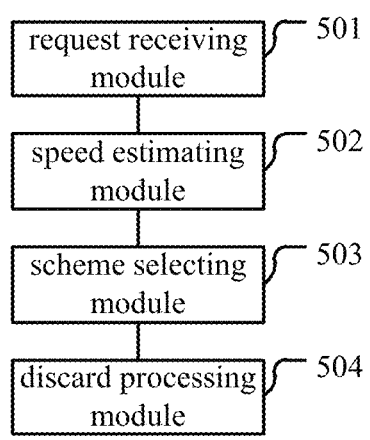
FIG. 5 is a diagram depicting the structure of a video playback apparatus provided by an embodiment of the present application.

FIG. 5 is a diagram depicting the structure of the video playback method provided by an embodiment of the present application. The apparatus includes:

a request receiving module 501, configured for receiving a data obtaining request for a video to be played back sent by a client, wherein the data obtaining request includes a multiplied speed for video playback;

a speed estimating module 502, configured for estimating a current data transmission speed according to historical data transmission speeds, wherein the historical data transmission speeds are obtained according to a preset statistical rule;

a scheme selecting module 503, configured for selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and a discard processing module 504, configured for performing discard processing on video data of the video to be played back according to the target video frame discarding scheme, and sending to the client the video data that has been subjected to the discard processing, so that the client plays back the video to be played back.

Optionally, the scheme selecting module 503 may include:

a first scheme determining sub-module, configured for determining a video frame discarding scheme with the highest priority in the preset video frame discarding schemes as a video frame discarding scheme to be selected;

a speed calculating sub-module, configured for calculating a target theoretical data transmission speed corresponding to the video frame discarding scheme to be selected, based on a bandwidth compression ratio, a rate for the video playback, and a bit rate for the video to be played back under the video frame discarding scheme to be selected;

a speed determining sub-module, configured for determining whether the target theoretical data transmission speed is greater than or equal to the product of the current data transmission speed and a first preset coefficient;

a second scheme determining sub-module, configured for determining the video frame discarding scheme to be selected as the target video frame discarding scheme, when the speed determining sub-module determines that the target theoretical data transmission speed is greater than or equal to the product of the current data transmission speed and the first preset coefficient;

a scheme updating sub-module, configured for, when the speed determining sub-module determines that the target theoretical data transmission speed is not greater than or equal to the product of the current data transmission speed and the first preset coefficient, updating the video frame discarding scheme to be selected to a video frame discarding scheme with the next lower priority according to the descending order by priority, and triggering the scheme selecting module, until the video frame discarding scheme to be selected is a video frame discarding scheme with the lowest priority; and determining the video frame discarding scheme to be selected as the target video frame discarding scheme.

Optionally, the speed estimating module 502 may be specifically configured for estimating the current data transmission speed $Speed_{actual}$ according to the following formula:

$$Speed_{actual}=T_1*Speed_1+\ldots+T_n*Speed_n$$

Where $Speed_n \ldots Speed_1$ are n historical data transmission speeds obtained according to the preset statistical rule, and are in ascending order by duration from the moment corresponding to each historical data transmission speed to the current moment, and $T_n \ldots T_1$ are preset coefficients respectively corresponding to $Speed_n \ldots Speed_n$, and the sum of $T_n \ldots T_1$ is equal to 1.

Optionally, $T_n<(T_{n-1}+\ldots+T_1)$.

Optionally, the video playback apparatus may further include:

a message generating module, configured for generating an alarm message for prompt when the target video frame discarding scheme is the video frame discarding scheme with the lowest priority.

Optionally, the video playback apparatus may further include:

a playback request receiving module, configured for receiving a video playback request sent by the client, before the request receiving module 501 receives the data obtaining request;

a query request sending module, configured for sending a query request for a video segment of the video to be played back to a storage management server according to the video playback request;

a query result receiving module, configured for receiving a query result returned by the storage management server, where the query result includes a storage server corresponding to the video segment; and a data buffering module, configured for obtaining the video data of the video to be played back from the storage server based on the video segment according to the query result, and buffering the obtained video data.

It can be seen from the above, in the solutions provided by the embodiments, after receiving a data obtaining request for a video to be played back sent by a client, a current data transmission speed is estimated according to historical data transmission speeds. A target video frame discarding scheme is selected from preset video frame discarding schemes, according to the current data transmission speed and a theoretical data transmission speed corresponding to a preset video frame discarding scheme. Discard processing is performed on the video data of the video to be played back according to the target video frame discarding scheme, and the video data that has been subjected to the discard processing is sent to the client, so that the client can play back the video to be played back. In the above solutions provided by the embodiments, the video data sent to the client is the video data after the video frame discarding processing, and thus requires less network bandwidth compared to sending all the video data of the video to be played back. Therefore, with the solutions provided by the embodiments described above, the required network bandwidth for a video playback may be reduced.

An embodiment of the present application further provides a server, which includes:

a processor, a memory, communication interfaces, and a bus.

The processor, the memory and the communication interfaces are connected and communicate with each other via the bus.

The memory stores executable program codes.

The processor reads the executable program codes stored in the memory to execute a program corresponding to the executable program codes, to carry out the video playback method.

The video playback method above includes:

receiving a data obtaining request for a video to be played back sent by a client, wherein the data obtaining request includes a multiplied speed for video playback;

estimating a current data transmission speed according to historical data transmission speeds, wherein the historical data transmission speeds are obtained according to a preset statistical rule;

selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and performing discard processing on video data of the video to be played back according to the target video frame discarding scheme, and sending to the client the video data that has been subjected to the discard processing, so that the client plays back the video to be played back.

It can be seen from the above, in the solutions provided by this embodiment, after receiving a data obtaining request for a video to be played back sent by a client, the server estimates a current data transmission speed according to historical data transmission speeds. The server selects a target video frame discarding scheme from the preset video frame discarding schemes, according to the current data transmission speed and a theoretical data transmission speed corresponding to a preset video frame discarding scheme. The server performs discard processing on the video data of the video to be played back according to the target video frame discarding scheme, and sends to the client the video data that has been subjected to the discard processing, so that the client can play back the video to be played back. In the above solutions provided by this embodiment, the video data sent by the server to the client is the video data after the video frame discarding processing, and thus requires less network bandwidth compared to sending all the video data of the video to be played back. Therefore, with the solutions provided by this embodiment, the required network bandwidth for a video playback may be reduced.

An embodiment of the present application further provides an application for carrying out the video playback method when being executed.

The video playback method above includes:

receiving a data obtaining request for a video to be played back sent by a client, wherein the data obtaining request includes a multiplied speed for video playback;

estimating a current data transmission speed according to historical data transmission speeds, wherein the historical data transmission speeds are obtained according to a preset statistical rule;

selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and performing discard processing on video data of the video to be played back according to the target video frame discarding scheme, and sending to the client the video data that has been subjected to the discard processing, so that the client plays back the video to be played back.

It can be seen from the above, in the solutions provided by this embodiment, by implementing the application above, the server estimates a current data transmission speed according to historical data transmission speeds, after receiving a data obtaining request for a video to be played back sent by a client. The server selects a target video frame discarding scheme from the preset video frame discarding schemes, according to the current data transmission speed and a theoretical data transmission speed corresponding to a preset video frame discarding scheme. The server performs discard processing on the video data of the video to be played back according to the target video frame discarding scheme, and sends to the client the video data that has been subjected to the discard processing, so that the client can play back the video to be played back. In the above solutions provided by this embodiment, the video data sent by the server to the client is the video data after the video frame discarding processing, and thus requires less network bandwidth compared to sending all the video data of the video to be played back. Therefore, with the solutions provided by this embodiment, the required network bandwidth for a video playback may be reduced.

An embodiment of the present application further provides a storage medium for storing executable program codes that is used to carry out the video playback method.

The video playback method above includes:

receiving a data obtaining request for a video to be played back sent by a client, wherein the data obtaining request includes a multiplied speed for video playback;

estimating a current data transmission speed according to historical data transmission speeds, wherein the historical data transmission speeds are obtained according to a preset statistical rule;

selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and performing discard processing on video data of the video to be played back according to the target video frame discarding scheme, and sending to the client the video data that has been subjected to the discard processing, so that the client plays back the video to be played back.

It can be seen from the above, in the solutions provided by this embodiment, by executing the executable program codes stored on the memory above, the server estimates a current data transmission speed according to historical data transmission speeds, after receiving a data obtaining request for a video to be played back sent by a client. The server selects a target video frame discarding scheme from preset video frame discarding schemes, according to the current data transmission speed and a theoretical data transmission speed corresponding to a preset video frame discarding scheme. The server performs discard processing on the video data of the video to be played back according to the target video frame discarding scheme, and sends to the client the video data that has been subjected to the discard processing, so that the client can play back the video to be played back. In the above solutions provided by this embodiment, the video data sent by the server to the client is the video data after the video frame discarding processing, and thus requires less network bandwidth compared to sending all the video data of the video to be played back. Therefore, with the solutions provided by this embodiment, the required network bandwidth for a video playback may be reduced.

For embodiments of the apparatus, server, application program and storage medium, since they are similar to the embodiments of the method, the description thereof is relatively simple; the relating parts could refer to those in the description of embodiments of the method.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, etc.

The embodiments described above are simply preferable embodiments of the present application, and are not intended to limit the scope of protection of the present application. Any modifications, substitutions, improvements, etc., which are made within the spirit and principles of the present application, will fall into the protection scope of the present application.

The invention claimed is:

1. A video playback method, comprising:
receiving a data obtaining request for a video to be played back sent by a client, wherein the data obtaining request comprises a multiplied speed for video playback;
estimating a current data transmission speed according to historical data transmission speeds, wherein the historical data transmission speeds are obtained according to a preset statistical rule;
selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and
performing discard processing on video data of the video to be played back according to the target video frame discarding scheme, and sending to the client the video data that has been subjected to the discard processing, so that the client plays back the video to be played back;
wherein the step of selecting a target video frame discarding scheme from preset video frame discarding schemes, according to the current data transmission speed and a theoretical data transmission speed corresponding to a preset video frame discarding scheme, comprises:

determining a video frame discarding scheme with the highest priority in the preset video frame discarding schemes as a video frame discarding scheme to be selected;

calculating a target theoretical data transmission speed corresponding to the video frame discarding scheme to be selected, based on a bandwidth compression ratio, a rate for the video playback, and a bit rate for the video to be played back under the video frame discarding scheme to be selected;

determining whether the target theoretical data transmission speed is greater than or equal to the product of the current data transmission speed and a first preset coefficient;

if so, determining the video frame discarding scheme to be selected as the target video frame discarding scheme; and if not, updating the video frame discarding scheme to be selected to a video frame discarding scheme with the next lower priority according to a descending order by priority, and returning to the step of calculating a target theoretical data transmission speed corresponding to the video frame discarding scheme to be selected, based on a bandwidth compression ratio, a rate for the video playback, and a bit rate for the video to be played back under the video frame discarding scheme to be selected, until the video frame discarding scheme to be selected is a video frame discarding scheme with the lowest priority, and then determining the video frame discarding scheme to be selected as the target video frame discarding scheme.

2. The method of claim 1, wherein the step of estimating a current data transmission speed according to historical data transmission speeds, comprises:

estimating the current data transmission speed Speedactual according to the following formula:

$$Speedactual = T1*Speed1 + \ldots + Tn*Speedn$$

where $Speedn \ldots Speed1$ are n historical data transmission speeds obtained according to the preset statistical rule, and are in ascending order by duration from the moment corresponding to each historical data transmission speed to the current moment, and $Tn \ldots T1$ are preset coefficients respectively corresponding to $Speedn \ldots Speed1$, and the sum of $Tn \ldots T1$ is equal to 1.

3. The method of claim 2, wherein $Tn < (Tn-1 + \ldots + T1)$.

4. The method of claim 1, wherein before the step of receiving a data obtaining request for a video to be played back sent by a client, the method further comprises:

receiving a video playback request sent by the client;

sending a query request for a video segment of the video to be played back to a storage management server according to the video playback request;

receiving a query result returned by the storage management server, where the query result comprises a storage server corresponding to the video segment; and obtaining the video data of the video to be played back from the storage server based on the video segment according to the query result, and buffering the obtained video data.

5. A video playback apparatus, comprising:

a request receiving module, configured for receiving a data obtaining request for a video to be played back sent by a client, wherein the data obtaining request comprises a multiplied speed for video playback;

a speed estimating module, configured for estimating a current data transmission speed according to historical data transmission speeds, wherein the historical data transmission speeds are obtained according to a preset statistical rule;

a scheme selecting module, configured for selecting a target video frame discarding scheme from preset video frame discarding schemes, according to the current data transmission speed and a theoretical data transmission speed corresponding to a preset video frame discarding scheme, wherein the theoretical data transmission speed is determined according to the multiplied speed for video playback; and a discard processing module, configured for performing discard processing on video data of the video to be played back according to the target video frame discarding scheme, and sending to the client the video data that has been subjected to the discard processing, so that the client plays back the video to be played back;

wherein the scheme selecting module comprises:

a first scheme determining sub-module, configured for determining a video frame discarding scheme with the highest priority in the preset video frame discarding schemes as a video frame discarding scheme to be selected;

a speed calculating sub-module, configured for calculating a target theoretical data transmission speed corresponding to the video frame discarding scheme to be selected, based on a bandwidth compression ratio, a rate for the video playback, and a bit rate for the video to be played back under the video frame discarding scheme to be selected;

a speed determining sub-module, configured for determining whether the target theoretical data transmission speed is greater than or equal to the product of the current data transmission speed and a first preset coefficient;

a second scheme determining sub-module, configured for determining the video frame discarding scheme to be selected as the target video frame discarding scheme, when the speed determining sub-module determines that the target theoretical data transmission speed is greater than or equal to the product of the current data transmission speed and the first preset coefficient; and a scheme updating sub-module, configured for, when the speed determining sub-module determines that the target theoretical data transmission speed is not greater than or equal to the product of the current data transmission speed and the first preset coefficient, updating the video frame discarding scheme to be selected to a video frame discarding scheme with the next lower priority according to a descending order by priority, and triggering the scheme selecting module, until the video frame discarding scheme to be selected is a video frame discarding scheme with the lowest priority, and then determining the video frame discarding scheme to be selected as the target video frame discarding scheme.

6. The apparatus of claim 5, wherein the speed estimating module is specifically configured for estimating the current data transmission speed Speedactual according to the following formula:

$$Speedactual = T1*Speed1 + \ldots + Tn*Speedn$$

where $Speedn \ldots Speed1$ are n historical data transmission speeds obtained according to the preset statistical rule, and are in ascending order by duration from the moment corresponding to each historical data transmission speed to the current moment, and $T_n \ldots T_1$ are preset coefficients respectively corresponding to $Speed_n \ldots Speed_1$, and the sum of $T_n \ldots T_1$ is equal to 1.

7. The apparatus of claim 6, wherein $T_n<(T_{n-1}+ \ldots +T_1)$.

8. The apparatus of claim 5, further comprising:
a playback request receiving module, configured for receiving a video playback request sent by the client, before the request receiving module receives the data obtaining request;
a query request sending module, configured for sending a query request for a video segment of the video to be played back to a storage management server according to the video playback request;
a query result receiving module, configured for receiving a query result returned by the storage management server, where the query result comprises a storage server corresponding to the video segment; and
a data buffering module, configured for obtaining the video data of the video to be played back from the storage server based on the video segment according to the query result, and buffering the obtained video data.

9. A server, comprising:
a processor, a memory, a communication interface, and a bus;
the processor, the memory and the communication interface being connected and communicating with each other via the bus;
the memory storing executable program codes; and
the processor reading the executable program codes stored in the memory to execute a program corresponding to the executable program codes, to carry out the video playback method of claim 1.

10. A non-transitory storage medium for storing executable program codes that carry out the video playback method of claim 1.

* * * * *